United States Patent [19]

Jacobson

[11] Patent Number: 4,659,253
[45] Date of Patent: Apr. 21, 1987

[54] DEEP WATER CABLE LAYING METHOD USING BUOYANCY MATERIALS

[76] Inventor: Alan R. Jacobson, 11123 239th Pl. SW., Edmonds, Wash. 98020

[21] Appl. No.: 721,843

[22] Filed: Apr. 8, 1985

[51] Int. Cl.[4] .......................... F16L 1/04; B63B 21/00
[52] U.S. Cl. .................................. 405/171; 405/158; 405/166
[58] Field of Search ............... 405/171, 166, 168, 158, 405/162, 172, 173

[56] References Cited

U.S. PATENT DOCUMENTS

| | | |
|---|---|---|
| 1,343 | 9/1862 | Horstmann . |
| 775,541 | 11/1904 | McConnell . |
| 2,871,665 | 10/1955 | Brandt .................. 405/171 |
| 2,900,795 | 8/1959 | Brandt .................. 405/171 |
| 2,978,339 | 10/1957 | Veatch et al. . |
| 3,136,529 | 6/1964 | Dickinson et al. ......... 405/171 X |
| 3,251,332 | 5/1966 | Vassar ................... 405/156 |
| 3,273,346 | 9/1966 | Delaruelle et al. ........ 405/171 X |
| 3,444,279 | 5/1969 | Dost ..................... 405/155 |
| 3,594,835 | 7/1971 | Wilson .................. 405/171 X |
| 3,599,435 | 8/1969 | Kolb ..................... 405/166 X |
| 3,622,437 | 11/1971 | Hobalca et al. . |
| 3,669,329 | 6/1972 | Blanchet et al. . |
| 3,781,778 | 12/1973 | Sawin et al. . |
| 3,900,543 | 8/1975 | Davis . |
| 4,021,589 | 5/1977 | Copley . |
| 4,048,686 | 9/1977 | Ege ..................... 405/171 |
| 4,110,991 | 9/1978 | Torkuhl . |
| 4,132,084 | 1/1979 | Francisco-Arnold . |
| 4,147,454 | 4/1979 | Willums . |
| 4,173,128 | 11/1979 | Corvelli ................ 138/130 X |
| 4,183,697 | 1/1980 | Lamy ................... 405/171 X |
| 4,274,757 | 6/1981 | Francisco-Arnold . |
| 4,293,005 | 10/1981 | Kelly . |
| 4,436,450 | 3/1984 | Reed . |
| 4,482,590 | 11/1984 | Bouley et al. . |

FOREIGN PATENT DOCUMENTS

| | | | |
|---|---|---|---|
| 2112786 | 9/1972 | Fed. Rep. of Germany ...... 405/171 |
| 1240554 | 7/1959 | France ................... 405/171 |
| 8006804 | 7/1972 | Netherlands ............. 405/171 |
| 1191146 | 6/1967 | United Kingdom ......... 405/171 |

OTHER PUBLICATIONS

Eccofloat-High Performance Syntatic Foam, (4 pg. document), Emerson & Cuming, Dewey and Almy Chemical Division, W. R. Grace & Co.

(List continued on next page.)

Primary Examiner—Dennis L. Taylor
Attorney, Agent, or Firm—Seed and Berry

[57] ABSTRACT

A buoyant material/cable assembly is formed by placing elongated segments of a syntactic foam material around an underwater cable or the like to form a structure suitable for deep water applications. Banding in the form of oppositely directed spirals extend about the assembly and about its length to secure the segments together, to the cable, and against relative movement with respect to the cable. The bandings are fastened together at selected intervals along their length.

Another form of the assembly consists of individual units of buoyant material formed of combined segments, secured together by bands. The units are spaced along the length of the cable.

Another form consists of individual flotation units, or buoys, secured by flexible links to the cable. Oppositely directed spiral bandings extend along the length of the cable to secure the flexible links against movement with respect to the cable and with respect to each other.

A floating platform is provided with cable tensioning, storage and feeding equipment; banding equipment; fastening equipment; buoyant material storage and supply reels and cable storage and supply reels in order to facilitate the construction of a buoyant material/cable assembly and simultaneous laying of the cable in deep water applications.

While cable is continuously fed from storage and into the water the flotation material is applied along its length and secured to the cable. The amount of flotation material applied is varied to accommodate the laying conditions and seafloor conditions.

13 Claims, 7 Drawing Figures

OTHER PUBLICATIONS

Eccofloat–Deep-Sea Floats and Buoys, (4 pg. document), Emerson & Cuming, Dewey and Almy Chemical Division, W. R. Grace & Co.

Buoyancy Materials for Offshore Riser Pipe, (12 pg. document), Emerson & Cuming, Inc., Flotation Products Division, Offshore Technology Conference, Paper #2654.

Eccofloat High Performance Syntatic Foam, Revised Product Line, Series EL and TG, Emerson & Cuming, Dewey and Almy Chemical Division, W. R. Grace & Co., Technical Bul.

Eccospheres Hollow Glass and Ceramic Microspheres Microballoons, Emerson & Cuming, Dewey and Almy Chemical Division, (4 pg. document).

Glass Microballoon Spheres as a Filter for Plastics, by Dr. Paul E. Rowe, Emerson & Cuming, Inc., Canton, Mass., 8-1973, (4 pg. document).

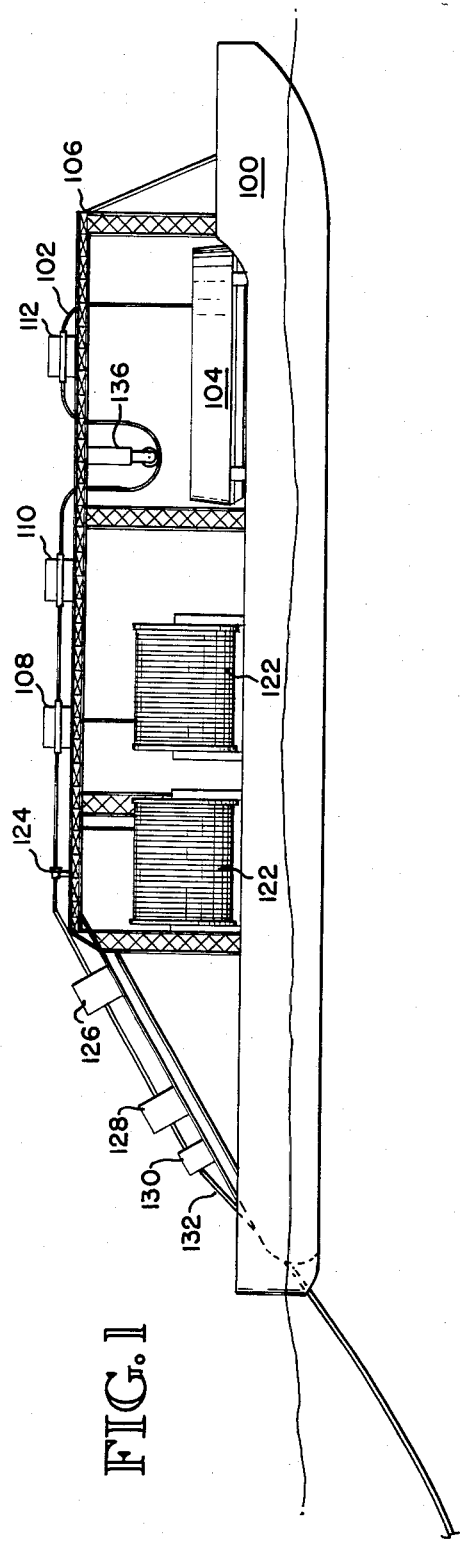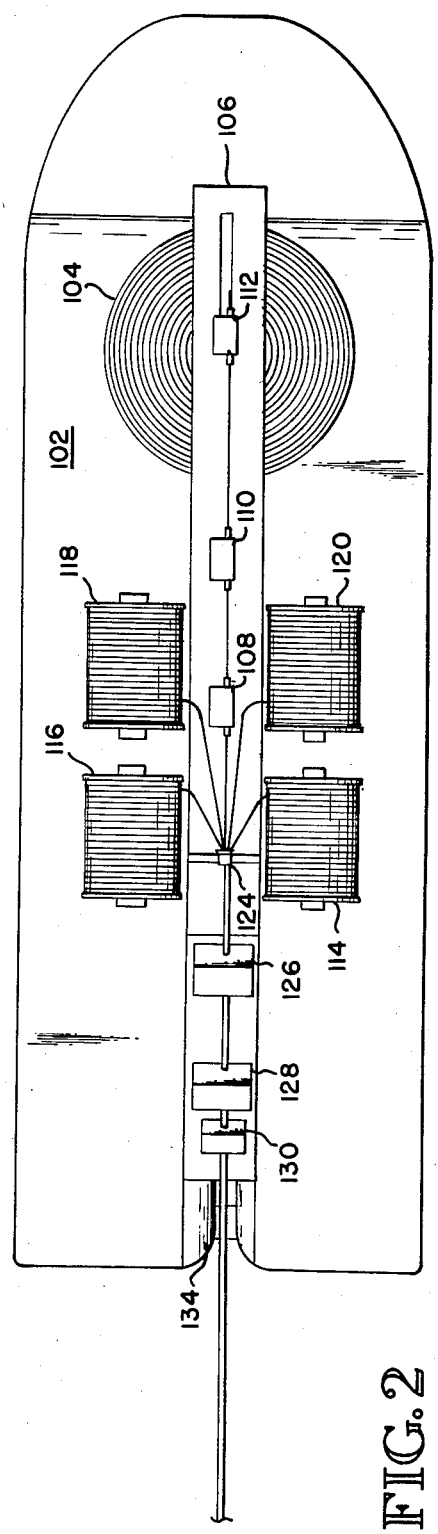

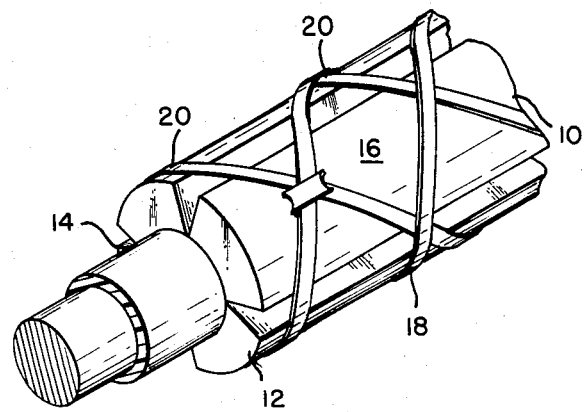
FIG. 3
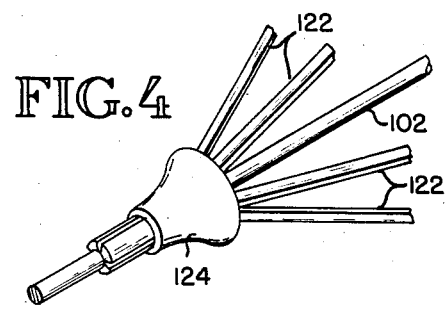
FIG. 4
FIG. 5
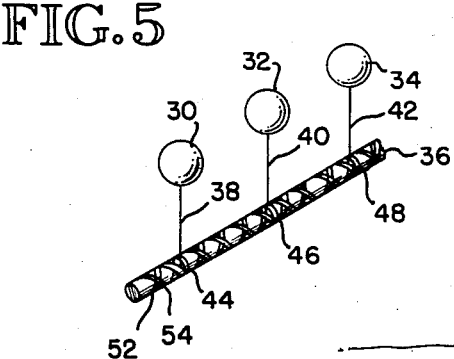
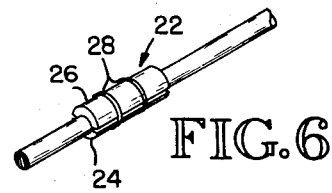
FIG. 6
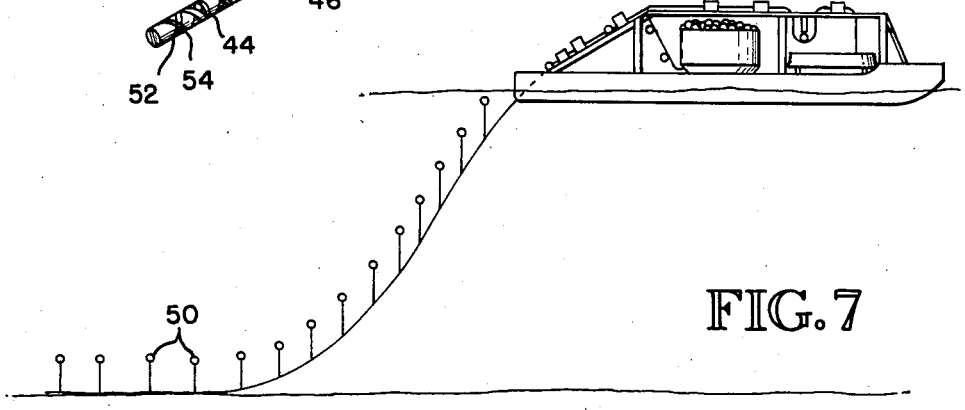
FIG. 7

DEEP WATER CABLE LAYING METHOD USING BUOYANCY MATERIALS

DESCRIPTION

1. Technical Field

The invention relates to a method, equipment and buoyant material/cable assembly used in connection with the laying of continuous electrical cables or the like underwater in depths ranging up to several thousand feet in depth.

2. Background Art

In order to lay an underwater cable or the like from a floating platform, the cable to be laid is stored on a large reel or turntable placed on the floating platform. The reel or turntable may be powered. Anywhere from several hundred feet to several miles of cable may be stored on the reel or turntable. The cable is removed from the reel or turntable, then allowed to pay out over the stern of the floating platform while the platform is advanced in order to deposit the cable along the desired underwater path. The pay out speed and cable tension is controlled by the use of one or more linear cable laying machines in conjunction with the speed of advancement of the platform and power of the platform's propulsion system. The cable laying machines, such as those available from Jacobson Brothers, Inc. of Seattle, Wash. have two opposing tracks which engage the top and bottom of the cable respectively. The track elements consist of neoprene blocks on roller chain. The blocks are grooved to form a seat for the cable. The tracks are forced together under pressure to prevent cable slippage. The track advance rate is controlled to maintain the desired cable pay out speed. Machines with a pull or braking capacity of 15 tons are available.

The type of cable used in underwater applications typically ranges in size from one and one-half inches to ten inches in diameter. It is normally a single or double armored cable. Such cables commonly have an external surface of jute, synthetic jute, steel or PVC. The cable itself may weigh from four to forty pounds per linear foot. A fully loaded cable reel or turntable may weigh 3,000 tons or more.

During the cable laying operation of tension, angle of the cable and bend radius must be controlled. To control bending and tension on the cable, the cable is guided mechanically between the equipment on the floating platform and off the stern of the platform. A cable tower or gantry is provided on the floating structure to which cable guides are attached. The cable guides are supports, commonly rollers, which guide the cable, prevent it from chafing and prevent sharp bends in the cable which would destroy the integrity of the cable.

Depending upon cable construction, if the water depth reaches approximately 1500 feet or more, the weight of the cable between the floating platform and the resting position of the cable on the seafloor may become excessive and can exceed the maximum mechanical tension that may be placed on the cable without damage. For cable being laid at depths on the order of 7,000 feet, the weight of the cable, and thus the tension on the cable at the floating platform, could be on the order of 100 tons or more.

In order to handle these high tension levels encountered in deep water laying application, specific cable construction techniques must be used. This increases significantly the cost of the cable and the time required to build the cable. It is not unusual for the lead time for construction of a cable with conventional tension characteristics to take a year or more.

In addition to modifying the cable, the linear cable laying machines must have a correspondingly higher puller or braking capacity, and the equipment on the floating platform must be also modified to handle the special cable which normally would weigh more and be more difficult to manipulate.

DESCRIPTION OF THE INVENTION

The invention relates to a method of laying underwater cable and the like from a floating platform, a buoyant material/cable assembly for use in deep water cable laying operations, and an apparatus for use in forming the assembly and laying the cable.

In one embodiment the buoyant material/cable assembly consists of elongated strips of buoyant material secured around the cable and extending along its length. Preferably the strips are continuous. Banding is used to secure the strips to the cable. In its preferred form the banding consists of two or more bands extending in oppositely directed spiral paths along the length of the cable and securing the flotation material to the cable. The bands are secured at least at intervals along their length together in order to maintain the integrity of the wrappings should a banding break at any point along its length.

An alternative embodiment of the buoyant material/cable assembly is in the form of individual segments of flotation material which are secured about the cable to form individual flotation units. The flotation units are placed at spaced intervals along the cable. The flotation material is secured together, to the cable and against movement along the cable, by surrounding bands.

An alternative embodiment of the buoyant material/cable assembly features the flotation material in the form of discreet units, buoys, such as spaced along the length of the cable. The buoys are secured by flexible links to the cable. Provisions are made, such as spiral bandings, to secure the buoys against movement with respect to the cable and with respect to each other.

In order to form the buoyant material/cable assembly and lay the cable equipment is provided on a floating platform. The equipment includes a cable storage facility, preferably in the form of a powered turntable. Linear cable laying machines are provided to remove the cable from storage, to control the tension of the cable being laid and to provide a back-up tension controller should the primary cable tension controller fail. Reels are provided for the storage and supplying of the continuous segments of the flotation material. Guides and a former are provided in order to bring the flotation material together in a position around the cable while the cable is being fed from the turntable and into the water. Banding machines secure the assembly together. A machine is provided to secure the bandings together at spaced intervals along the buoyant material/cable assembly. Where individual flotation units in the form of buoys are utilized a hopper is used to store the buoys prior to the time they are conveyed to a position near the cable where they will be attached as the cable is fed from storage and into the water.

In operation the cable is continuously removed from storage under the control of a linear cable machine. Simultaneously the continuous segments of buoyant material are fed to the former and brought into their final position around the cable. Banding are then applied around the buoyant material/cable to secure the buoyant material to the cable and against movement along the cable and then the bandings are fastened together. The assembly is then fed into the water.

In the case of the use of individual buoyant units attached by flexible links to the cable, the buoys are brought into proximity with the cable downstream from the cable tensioning machines where they are secured to the flexible links to the cable. Banding is then applied to secure the links against relative movement and movement with respect to the cable. The bandings are then secured together at spaced intervals. The assembly is then fed into the water.

BRIEF DESCRIPTION OF THE DRAWINGS

FIG. 1 is a side elevation view of a barge, carrying the cable laying equipment, in the process of laying cable.

FIG. 2 is a top plan view of the barge of FIG. 1.

FIG. 3 is an isometric view, in section, of a cable with an embodiment of the buoyancy material secured to the cable.

FIG. 4 is an enlarged, isometric view of a portion of the cable laying equipment illustrating the former which aids in applying continuous strips of buoyancy material to the cable.

FIG. 5 is an enlarged, side elevation view of the cable with an alternative embodiment of the buoyant material/cable assembly where the buoyant material is secured in individual flotation units along the length of the cable.

FIG. 6 is an enlarged, isometric view of a another alternative embodiment of the buoyant material/cable assembly.

FIG. 7 is a side elevation view of a cable laying platform illustrating the cable laying operation in which the flotation units illustrated in FIG. 5 are being used.

BEST MODE FOR CARRYING OUT THE INVENTION

In order to reduce the tension placed on an underwater electrical cable, buoyancy material is secured to the cable along its length. The addition of buoyancy material reduces the effective underwater weight of the cable and permits the laying of underwater cable at a depth much greater than would be possible otherwise. The weight of the cable in the catenary formed between the laying platform and the cable's resting position on the bottom of the seafloor increases with the weight of the cable and the depth of the water. The addition of flotation also permits the use of cable laying equipment, particularly cable tension controlling machines, of a capacity and construction lighter than that which would otherwise be possible.

While the invention is illustrated in connection with an underwater cable, use in connection with other forms of continuous flexible structures such as tubing would be similar.

One embodiment of the invention is illustrated in FIG. 3. Buoyant material, such as flotation segments 10, 12, 14 and 16 are secured to the cable. The segments are preferably continuous strips of flotation material having identical cross sections. The segments may be formed of strips. The flotation elements are of a material which will flex with the cable. The cross sectional structure of the flotation segments for any given application may vary as may the number of segments utilized. The segments may fully surround the external surface of the cable or may only partially surround the cable. For example, the flotation segment may be hemi-cylindrical with two such segments fully enclosing the cable.

The buoyancy material must be able to withstand the pressure at the depth to which the cable is to be laid. The preferred material utilized is a high-performance syntactic foam material. Such foam has hollow spherical particles dispersed in some form of binder. An example of such material is the product sold under the ECCOFLOAT brand by Emerson and Cuming, Inc., Deweyn Almy Chemical Division, W. R. Grace & Co., Canton, MA 02021, U.S.A. Such material has Emerson and Cuming's MICROBALLOON brand spherical particles in a thermosetting plastic binder. This type of material will have a service depth from several thousand feet to 36,000 feet and a specific weight ranging from 24 to 42 pounds per cubic foot. See also U.S. Pat. No. 3,622,437, Cook. The material may be provided with a protective coating such as that disclosed in U.S. Pat. No. 4,021,589, Copley and sold under Emerson and Cuming's ECCOHIDE brand.

The flotation segments are secured to the cable to remain there for the entire service life of the cable, normally 20 to 40 years. The fastening may take the form of the crossed spiral bindings, such as bands 18 and 20 illustrated in FIG. 3. The banding preferably is in the form of stainless steel strapping or strips of a synthetic plastic material, such as nylon, or the Kevlar brand, synthetic woven, aramatic polyamide fiber material by DuPont.

One spiral binding advances down the cable in a clockwise fashion while the other advances down the cable in an opposite hand spiral. To prevent loss of integrity of the buoyant material/cable assembly of oppositely wound spiral bandings are secured together periodically along the length of the cable at their crossing points. They may be secured together such as by the use of fasteners, welding, or clips, as illustrated in FIG. 3.

An alternate embodiment of the buoyancy elements are illustrated in FIG. 6. In this embodiment, the buoyancy material is formed into individual flotation units 22 which are spaced at spaced intervals along the length of the cable. For example, the flotation unit may consist of two hemi-cylindrical segments 24 and 26 which are secured to the cable such as by the use of bands 28.

A further alternative embodiment of the buoyancy elements is illustrated in FIG. 5. In FIG. 5 the buoyancy material is formed of individual flotation units which do not surround the cable. They preferably take the form of spherical buoys 30, 32 and 34. The buoys are secured at intervals along the length of the cable. The buoys are attached to the cable 36, such as by the use of interconnecting cables 38, 40 and 42, respectively, and securement collars 44, 46 and 48, respectively.

During installation of the cable it is particularly important that the discreet buoyancy units do not move along the length of the cable. Referring to FIG. 7, which illustrates a cable laying operation with the water depth greatly reduced for purposes of illustration, if the buoys 50 slide up the cable during installation, the tension of the cable may exceed the acceptable limits and separate. Alternatively, the tension on the cable may exceed the capacity of the cable laying equipment resulting in a runaway. A runaway is a dangerous condition in which the cable would begin paying out at an uncontrolled rate resulting in serious risk of injury to personnel and destruction or damage to equipment and the cable. Once a runaway begins it normally cannot be stopped. In the embodiment illustrated in FIG. 5, in order to prevent this, oppositely wound spiral bands 52 and 54 may extend along the length of the cable to limit movement of the collars.

If the slipping of the flotation units was not severe enough to cause destruction or loss of the cable it could still cause the formation of loops in the cable. The collection of the flotation units could cause the cable to have a positive buoyancy, forming a buoyant section of cable which would float above the seafloor.

The amount of flotation added may be varied to suit the application. If the effective weight of the cable is too light or it is buoyant, the cable will not be pulled down properly to the seafloor or may be difficult to lay accurately in its appropriate position due to the increased impact of currents.

The effective weight of the cable may be varied along the length of a single run of cable. Flotation may be added or reduced to accommodate the depths or other conditions encountered during the laying operation or to which the cable will be exposed.

Mid-cable repairs are facilitated by the reduction of the effective weight of the cable through the use of buoyancy material. In the repair process the cable is drawn to the surface at a mid-point; forming an inverted "u" and doubling the tension on the cable over that normally encountered during laying of the central portion of the run. The use of the buoyancy material and the effective reduction of the weight of the cable also facilitates laying the final bight of the cable in such a repair operation since the tension of the cable is doubled when the cable is formed into an inverted "u" in the process of laying the final bight.

A cable laying operation in which the buoyant material/cable assembly in the form illustrated in FIG. 3 is formed is illustrated in FIGS. 1 and 2. The cable laying equipment is supported on a floating platform such as barge 100. The barge may be maneuvered in a conventional manner such as by, using a tug. The tug's efforts may be assisted by a trailing tug which will help to align the vessel. Alternatively the barge may be self-propelled and include steering thrusters to help position the barge. In shallower locations the barge may be positioned through the use of positioning anchors.

In order to store the cable 102 a storage device such as a turntable 104 is provided. The turntable is powered in order to unwind the cable from the drum on the turntable on which the cable is wound.

A cable gantry 106 extends down the central portion of the barge. Supported on the cable gantry are linear cable laying machines, such as the primary cable tensioning machine 108, backup cable tensioner 110 and cable transfer machine 112.

Buoyancy segment storage is provided such as by the power driven reels 114, 116, 118 and 120 with support stands.

The buoyant material 122 is stored by winding it on the reels. It is in the form of continuous segment wound about the reel.

At the aft end of the horizontal section of the cable gantry is a former 124, illustrated in more detail in FIG. 4. The cable 112 and the four strips of flotation material are fed through the former. The former serves to guide the flotation material into its final position surrounding the advancing cable.

Immediately downstream of the former is a strapping machine 126. The strapping machine applies a spiral binding in one direction along the cable as it passes through the strapping machine. A second strapping machine 128 downstream of the first applies a spiral binding in the opposite direction. Downstream from both strapping machines is a fastening machine 130 which secures the spiral bindings together at their crossing points at selected locations.

The buoyant material/cable assembly 132 is then fed through a channel 134 located in the stern of the vessel.

Cable guides, buoyant material guides, strip guides, and the buoyant material/cable assembly guides are conventional structures and are not illustrated.

In operation the turntable is rotated at a variable rate to discharge the cable at a uniform rate. Assisting in this operation is the cable transfer machine 112 which is controlled, such as by loop sensor 136 to maintain an adequate supply of cable to the primary and backup cable tensioners 108 and 110 respectively. The loop sensor simply monitors a slack loop in the cable to make sure enough cable is being supplied. The primary tensioner supports the weight of the cable extending off the stern of the barge and the tension due to the movement of the barge.

The buoyant material in strip form is guided through the former along with the cable. After the buoyant material has been positioned around the cable banding is applied. The banding is secured at selected cross points to prevent loss of integrity of the buoyant material/cable assembly structure which might otherwise be caused by breakage of a band at some point.

The entire operation, using the equipment decribed, can be performed continuously for long lengths of cable.

The application of the buoyant material in the form illustrated in FIG. 6 is very similar. The principal differences are that the buoyant material is cut to the desired length and the strapping may only be applied in circumferential bands rather than along spiral paths. Alternatively, the buoyant material may be precut or formed in segments of the desired length.

The application of the flotation material in the form illustrated in FIG. 5 is illustrated in FIG. 7. The procedures are similar to those described above except that the buoys are stored in a hopper from which they are conveyed to their point of securement to the cable.

While the invention has been described in conjunction with specific embodiments of the buoyant material/cable assembly, specific equipment for forming the assembly and laying cable, and specific procedures, it should be understood that these are merely illustrative. Numerous modifications may be made to the assembly, in the equipment used, and in the procedures utilized without departing from the spirit and scope of the invention and it is intended that the patent shall cover whatever features and procedures of patentable novelty that exist in the invention and are encompassed within the following claims.

I claim:

1. A method for permanently reducing the apparent weight of nonbuoyant submarine cable intended to rest on the sea bottom at depths in excess of 1500 feet and to facilitate the laying and later recovery of the cable, comprising the following steps:

paying out a long length of nonbuoyant submarine cable from a floating platform for residence on the ocean bottom;

releasably attaching sufficient buoyancy material to the cable as the cable is payed out to produce a cable assembly having a permanently reduced negative buoyancy and wherein the buoyancy material has sufficient resistance to hydrostatic implosion to maintain the reduced negative buoyancy of the assembly on the ocean bottom for the service life of the cable; and maintaining the attachment of the buoyancy material to the cable while the assembly is in the water.

2. The method of claim 1 wherein the buoyancy material used is a syntactic foam material having resistance to hydrostatic implosion at depths in excess of 4000 feet.

3. The method of claim 1 including the steps of lifting the cable assembly from the sea bottom and onto the floating platform and removing the buoyancy material from the cable as the assembly is brought onto the platform.

4. The method of claim 3 wherein the buoyancy material attaching step includes the step of attaching a long, flexible, continuous strip of the buoyancy material from a reel of the material to the cable.

5. The method of claim 4 wherein the buoyancy material attaching step includes the step of applying a plurality of continuous, overlapping spiral bands around the outside of the strip and the cable to frictionally engage the strip with the cable.

6. The method of claim 5 including the step of securing the bands together at some of the overlapping points along the length cable assembly.

7. The method of claim 1 wherein the buoyancy material attaching step includes the steps of feeding a plurality of long, flexible, continuous strips of the buoyancy material from a plurality of reels through a forming device which postions the strips against the outside of the cable and longitudinally aligned with the cable axis.

8. The method of claim 7 wherein the buoyancy material attaching step further includes the steps of applying a plurality of continuous, overlapping spiral bands around the outside of the strips to frictionally engage the strips with the cable and including the step of securing the overlapping bands together at some of the overlapping points along the length of the cable assembly.

9. A reduced apparent weight, negative buoyancy submarine cable assembly, payable from a floating platform, for laying on and recovery from the sea floor, comprising:

a long, continluous length of nonbuoyant submarine cable, payable from and receivable on a reel on a floating platform;

a long, flexible, continuous strip of buoyancy material adjacent to the cable and payable to and from a reel, having sufficient buoyancy and resistance to hydrostatic implosion to provide the cable assembly with a reduced apparent weight and slight negative buoyancy when the assembly is at the sea bottom; and means for frictionally engaging the strip of buoyancy material with the cable as the cable and strip are payed out from the platform.

10. The cable assembly of claim 9 wherein the buoyancy strip has a curved surface to closely fit the curvature of the cable and wherein the frictional engaging means includes a plurality of continuous, tensioned, overlapping spiral bands placed around the cable and buoyancy strip, wherein the bands are connected together at some of the overlaps.

11. The cable assembly of claim 10 indluding a plurality of the long, flexible, continuous strips adjacent to the cable and bound by the bands.

12. The cable assembly of claim 11 wherein the buoyancy strips include a syntactic foam material having implosion resistance at depths greater than 4000 feet.

13. A negative buoyancy submarine cable assembly having a reduced apparent weight to facilitate the laying and recovery of the assembly to and from the sea floor, comprising:

a long, continuous length of submarine cable payable to and from a reel on a floating platform;

a sufficient quantity of buoyancy material, attached to the cable as the cable is payed from the reel to reduce the apparent weight of the cable and provide the assembly with a slight, permanent negative buoyancy when the assembly is on the sea floor; and means for releasably attaching the buoyancy material to the cable as the cable is payed out and for removing the buoyancy material from the assembly as the assembly is payed in.

* * * * *